(12) United States Patent
Gehm et al.

(10) Patent No.: US 10,542,723 B2
(45) Date of Patent: Jan. 28, 2020

(54) MILKING SYSTEM

(71) Applicants:Lanny Gehm, Lisle, NY (US); William Gehm, Lisle, NY (US)

(72) Inventors: Lanny Gehm, Lisle, NY (US); William Gehm, Lisle, NY (US)

(*) Notice: Subject to any disclaimer, the term of this patent is extended or adjusted under 35 U.S.C. 154(b) by 639 days.

(21) Appl. No.: 15/216,169

(22) Filed: Jul. 21, 2016

(65) Prior Publication Data
US 2018/0020633 A1  Jan. 25, 2018

(51) Int. Cl.
| | |
|---|---|
| *A01J 5/04* | (2006.01) |
| *A01J 5/007* | (2006.01) |
| *A01J 5/017* | (2006.01) |
| *A01J 5/16* | (2006.01) |
| *G05B 15/02* | (2006.01) |
| *G05D 16/20* | (2006.01) |
| *F16K 31/06* | (2006.01) |

(52) U.S. Cl.
CPC .............. *A01J 5/048* (2013.01); *A01J 5/007* (2013.01); *A01J 5/0175* (2013.01); *A01J 5/16* (2013.01); *G05B 15/02* (2013.01); *G05D 16/20* (2013.01); *F16K 31/06* (2013.01)

(58) Field of Classification Search
CPC .......... A01J 5/048; A01J 5/007; A01J 5/0175; A01J 5/16; A01J 5/10; A01J 5/14
USPC ........... 119/14.28, 14.29, 14.3, 14.31, 14.32, 119/14.34, 14.35, 14.37
See application file for complete search history.

(56) References Cited

U.S. PATENT DOCUMENTS

| | | | | |
|---|---|---|---|---|
| 1,355,839 | A | * | 10/1920 | Mehring .................... A01J 5/10 119/14.27 |
| 1,858,266 | A | * | 5/1932 | Dinesen .................... A01J 5/10 119/14.16 |
| 2,017,754 | A | * | 10/1935 | Hodsdon .................... A01J 5/12 137/105 |
| 2,646,058 | A | * | 7/1953 | Thomas ..................... A01J 5/10 119/14.4 |
| 4,306,590 | A | | 12/1981 | Boudreau |
| 5,141,403 | A | | 8/1992 | Guo et al. |
| 5,178,095 | A | | 1/1993 | Mein |
| 5,218,924 | A | | 6/1993 | Thompson et al. |
| 5,697,325 | A | | 12/1997 | Gehm et al. |

(Continued)

FOREIGN PATENT DOCUMENTS

EP  1186229 A2  3/2002

OTHER PUBLICATIONS

International Search Report for PCT/US2017/042099 dated Jan. 17, 2018.

(Continued)

*Primary Examiner* — Trinh T Nguyen
(74) *Attorney, Agent, or Firm* — Brown & Michaels, PC

(57) ABSTRACT

Improving milking system performance through the incorporation of a source of greater than atmospheric pressure air into a pulsator while limiting total pressure in the teat cup. The system is further improved by providing an improved supply of regulated vacuum to the milking cluster throughout the milking process. The system is further improved with a monitoring and detecting the functional failure of the pulsation assemblies. Additional system improvements are provided with the addition of a fresh air valve assembly, a wireless method of regulating vacuum levels and the remote location of a pulsator assembly in a basement style parlor.

9 Claims, 9 Drawing Sheets

(56) References Cited

U.S. PATENT DOCUMENTS

| | | | |
|---|---|---|---|
| 6,045,331 | A | 4/2000 | Gehm et al. |
| 6,553,934 | B2 | 4/2003 | Gentner et al. |
| 2006/0112887 | A1 | 6/2006 | Brown et al. |
| 2008/0067461 | A1 | 3/2008 | Peterson |
| 2011/0168098 | A1 | 7/2011 | Gehm |
| 2012/0312237 | A1* | 12/2012 | Hansen .................. A01J 5/017 119/14.02 |
| 2013/0118611 | A1 | 5/2013 | Torgerson et al. |
| 2013/0263788 | A1* | 10/2013 | Buck ........................ A01J 5/00 119/14.18 |
| 2017/0000075 | A1* | 1/2017 | Johansson ................ A01J 5/12 |

OTHER PUBLICATIONS

"IQ Milking Unit Animation.mpg", retrieved from https://www.youtube.com/watch?v=UPVKMtQ9rII; Mar. 2011.

* cited by examiner

MILKING SYSTEM

FIELD OF THE INVENTION

The present invention pertains to an improvement of a milking system for domesticated animals and, more particularly to a milking system which provides improved milking vacuum stability and liner action at the teat.

DESCRIPTION OF RELATED ART

Typical milking systems apply vacuum to the teat end combined with periodic alternating pressure to the teat cup of a milking apparatus. This results in the removal and the flow of milk from the udder and teat to which the teat cup is applied. Vacuum is supplied to the teat end through a series of interconnecting members such as pipes, meters, sensors and hoses that are connected between the liner and the vacuum pump. A means of regulating the system vacuum level is incorporated in the series of interconnecting members between the pump and the liner. The alternating pressure between the atmospheric pressure and vacuum cycles is controlled by a valving apparatus that feeds a pulsation chamber (volume between the liner and the shell). This valving apparatus is commonly referred to as a pulsator.

Modern milking systems have grown in size and complexity with the incorporation of sensors and meters to measure and detect milk flow and quantity of milk yielded by individual animals and automate action of both the attach and detach of the milking unit, or cluster, on the animal. The fundamentals of milking the animal have not changed, while the size and complexity has impacted the performance of the milking action on the animal. It remains critical to ensure proper stable and safe vacuum at the teat end of the animal throughout the milking process.

The incorporation of technology to improve automation of the milking process and the increase in size of milking facilities has in many cases degraded vacuum stability and the milking process, resulting in harsh treatment of the animals and reduced milk quality and total production. Many milking system products and components in use on modern dairy farms restrict the flow of milk, vacuum, and air, causing degraded milking performance. These restrictions reduce vacuum stability at the teat end and degrade the liner action, such that the teat is treated harshly, and milk flow and extraction is diminished and prevented, impacting animal welfare.

Some prior art pulstors have described designs in which a positive pressure source—greater than atmospheric air pressure, is used as the source of fresh air and as a means of improving milking performance. Those prior art designs have delivered a greater than atmospheric air pressure to the pulsation chamber during the rest phase. Those designs have created an additional problem, which is an over pressure applied to the teat caused by the greater than atmospheric air pressure, compressing the teat when the liner is closed by that pressure. This over pressure causes harm to the teat and can further increase the reverse pumping action of milk in the teat sinus back up into the udder, thereby increasing the risk of bacterial infections in the udder. This pressure also creates an additional burden on the vacuum pump of the milking system, as it increases the total volume of air to be removed from the system. FIG. 2 provides an example of a conventional pulsator in which fresh air is supplied through fresh air inlet port (105) and vacuum is supplied through vacuum inlet port (106) with plunger (103) providing the valving means of alternately connecting either fresh air inlet port (105) or vacuum inlet port (106) to pulsator output (110). The fresh air supply is connected to the vacuum supply when plunger (103) of FIG. 2 is traveling between fresh air inlet port (105) and vacuum supply (106) when actuated by a solenoid (102).

U.S. Pat. No. 5,218,924 discloses a milking machine incorporating a positive pressure (greater than atmospheric) source into the function of a conventional pulsator pulsator. This design seeks to control the rate of liner movement throughout the transition process by controlling pressure transition times through the use of a positive pressure source of fresh air. This design requires the use of a pressure transducer and associated controller to manage the flow of air into and out of the pulsation chamber. This design seeks to provide a highly controlled and variable rate of pressure changes within the pulsation chamber with no defined means of limiting the final maximum pressure to atmospheric pressure within the pulsation chamber.

U.S. Pat. No. 5,178,095 discloses a milking machine incorporating a positive pressure (greater than atmospheric) source into the function of a conventional pulsator in combination with a unique thin walled floppy liner. This design offers no means of limiting the final maximum pressure to atmospheric pressure within the pulsation chamber. The patent discloses the fact that "Though thin floppy liners have been known for some time, they have not been successfully used."

There has never been a commercial introduction into the market of any milking system incorporating a greater than atmospheric pressure fresh air source for pulsators.

U.S. Pat. No. 5,141,403 discloses a variable speed vacuum level control system that continuously varies vacuum pump speed to provide a relatively fixed vacuum operating level for dairy applications. The design offers no means of measuring vacuum level close to the receiver jar on rotary parlor applications. Those parlor designs require a rotating union in the center of the rotating platform on which the cows are milked. The rotating union must incorporate slip bands to permit the electrical continuity from the outer to the inner halves of the union. The electrical noise created in those slip bands makes it difficult to accurately measure the low voltage signal changes transmitted by a pressure transducer. All installations to date of variable speed vacuum control systems have used a wire connected to the pressure transducer with the transducer installation limited to a location outside of the rotary union.

U.S. Pat. No. 4,306,590 discloses a milking apparatus discharge valve that is integrated with a large milk collecting volume to which the milking unit is attached. This design does not offer a means of connecting that volume in parallel to the primary milk flow path through a series of meters or sensors, nor does it offer a secondary path for a controlled vacuum source. This design simply provides a volume for collecting the entire content of milk yielded from one animal during the milking process.

U.S. Pat. No. 6,553,934 discloses an apparatus for monitoring milking facility pulsation. This design specifically monitors the pulsation characteristics of an individual pulsator thereby requiring one monitor apparatus for each individual pulsator. This design increases both the cost of the milking system and further degrades the performance of the pulsation system with the addition of volume of interconnecting hoses to monitor each individual pulsator.

The proposed invention seeks to address the numerous technical and performance issues known to exist in modern milking facilities. The present invention optimizes vacuum stability at the teat end throughout the milking process while ensuring proper treatment of the teat.

SUMMARY OF THE INVENTION

An improved milking system is disclosed that optimizes milking system performance with features to reduce fluid flow restrictions and improve vacuum system efficiency. A method of incorporating a greater than atmospheric air pressure fresh air supply into the pulsation valve mechanism to improve pulsation function is disclosed with an optional method of limiting the total pressure within the pulsation chamber. This approach includes the use of a positive pressure air source having an inherent design limited maximum supply pressure with an example being a regenerative blower. The method is further improved by incorporating a means of automatically venting the positive pressure supply when pulsator demand for fresh air is reduced to prevent excess heating of the blower providing the fresh air. The method may be further improved with limited solenoid on time.

A method of delivering a more stable vacuum source to the teat end is disclosed with the addition of a vacuum controlled volume into the interconnecting path to the liner to provide a source of vacuum that bypasses the flow restrictions created by milk meters, milk sensors and other flow restricting features in the conventional system milk flow path. The added volume includes an inlet from the liner/cluster, an outlet to the collecting milk line and a new added inlet for an additional vacuum source for improved vacuum stability. The additional vacuum source has an optional feature for controlling and regulating the vacuum supply to the volume. The volume includes an option for preventing backflow of milk into the added vacuum source and an option for including a fresh air vent feature.

A method of improving vacuum regulation in milking facilities is disclosed where those facilities incorporate variable speed vacuum pump regulation. Typical conventional facilities utilize closed loop feedback of a measured vacuum level to continuously adjust vacuum pump speed for vacuum level regulation. Design limitations in some facilities, in particular rotary facilities, prevents the location of the vacuum transducer from being placed near the receiver and main milk lines. The disclosed invention incorporates a wireless method of transmitting vacuum level and provides further improvement with the addition of a mechanical regulator and an innovative vacuum pump speed control to provide improved vacuum regulation.

A method of sealing a solenoid for use in a positive pressure fresh air system is disclosed. A pulsator design incorporating two solenoids, with one solenoid dedicated to fresh air and one solenoid dedicated to vacuum, requires the ends of the solenoids to be sealed to prevent the leaking of air. A method of sealing the ends is defined in which a flexible sealing material is utilized to seal the inner volume of the solenoid to prevent positive pressure from displacing the seal. The flexible sealing material is material which can be dispensed or is flowable and then can cure in place, resulting in a solid flexible material.

An improved multi-hose collection volume is disclosed for use on robotic milking systems. Robotic milking systems utilize one individual milk supply hose for each teat cup assembly. The individual hoses are joined in a collecting volume to merge the flow of milk from the individual teat cups. The innovation defines an improved volume to reduce vacuum fluctuations in the individual hoses caused by the flow of milking into the collecting volume. The collecting volume is further improved by incorporating an additional vacuum source that may also be regulated to control vacuum levels supplied. The volume provides a means of accepting fluid from multiple sources while preventing direct fluid flow from one source from flow over the entrance port of another source.

A method of detecting a solenoid failure is disclosed. Solenoid failures result in loss of pulsation function impacting milking performance A solenoid failure can be the result of either a broken coil or a stuck solenoid plunger. The disclosed innovation monitors the system electrical resistance to determine if one or more solenoids have a failed coil by measuring the current supplied to the group of solenoids connected to the power supply. A solenoid with a plunger that is stuck open can be detected by measuring the pressure in the fresh air supply pipe that each pulsator is connected to. A stuck solenoid will cause changes in the pressure drop in the fresh air supply pipe when all pulsators are operated that is different than when all pulsators are operating without a stuck solenoid. The disclosed invention provides a means of monitoring a group of solenoids to detect a failure without impacting the performance of the pulsators. The identification of the specific failed solenoid does require further evaluation of each individual pulsator.

DETAILED DESCRIPTION OF THE INVENTION

Figure 1:
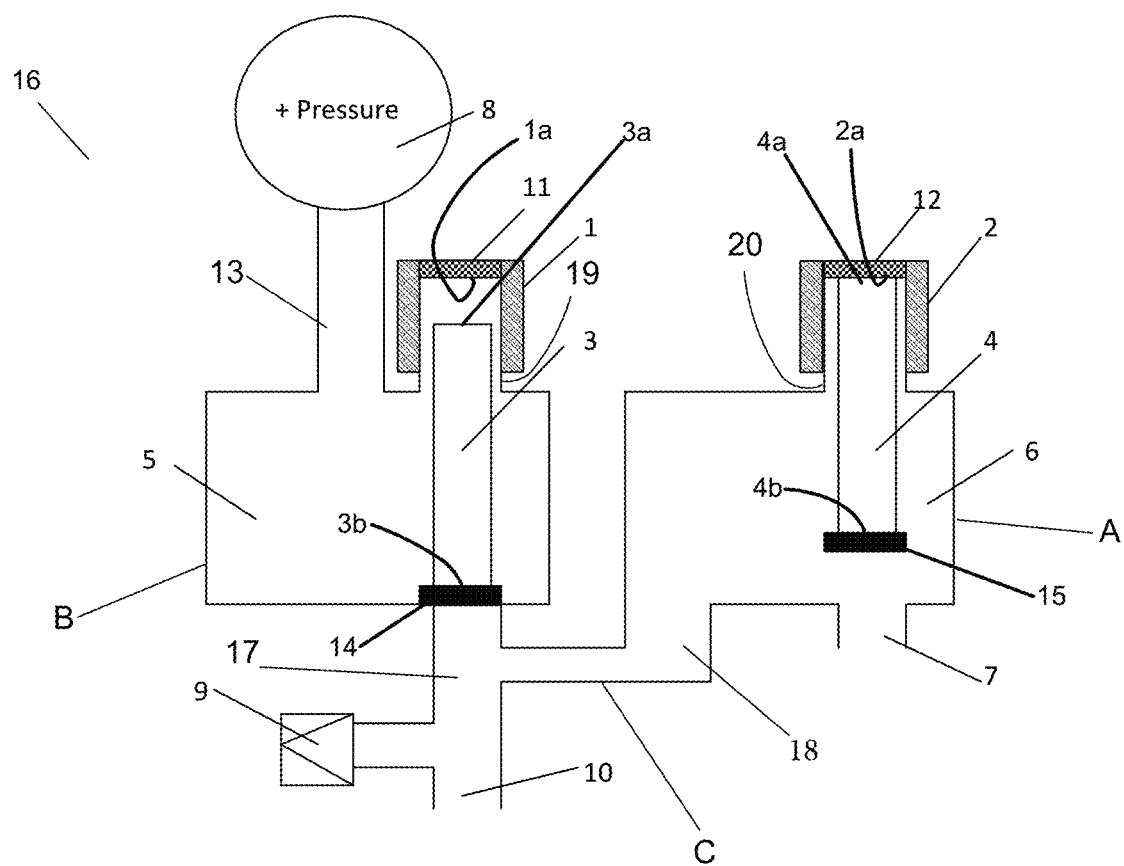
FIG. 1 shows a schematic of the pulsation valve apparatus of the present invention.
Figure 2:
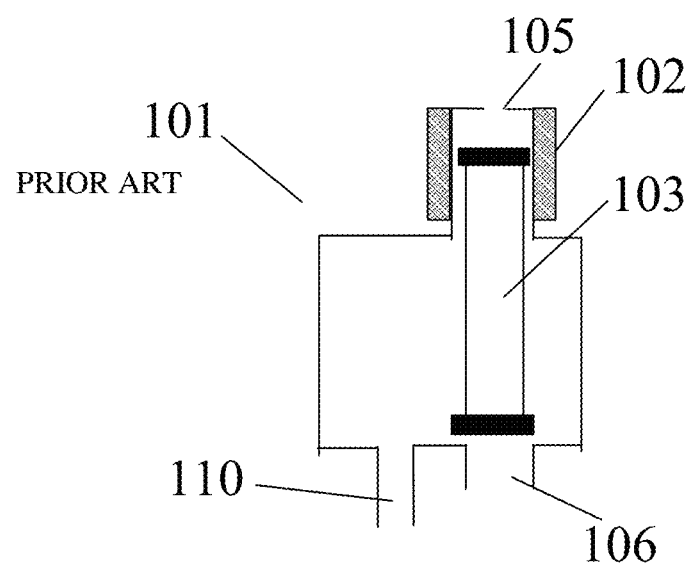
FIG. 2 shows a schematic of a conventional pulsation valve apparatus.

Referring to FIG. 1, a pulsator valving mechanism (16) used in the milking process of animals is shown. The basic design of this pulsator is described in U.S. Pat. No. 5,697,325. Prior art design pulsators, including the one described in U.S. Pat. No. 5,697,325, utilizes ambient air as the source of fresh air to provide pulsator output or common outlet (10) with atmospheric pressure air during the rest phase of the milking action. Prior art pulsators typically access atmospheric air directly through open ports in the pulsator or through connections to fresh air supply pipes having air filters incorporated to remove airborne debris.

It is desirable to provide a source of greater than atmospheric pressure air to the pulsator to ensure an adequate supply of fresh air within a filtered fresh air supply to the pulsator and to compensate for the large pressure drop between the pulsator and the cluster as the distance between the two becomes large. The greater than atmospheric pressure air will allow the pulsation chamber to increase from vacuum to atmospheric air pressure more quickly to enable proper liner action.

The greater than atmospheric pressure air must also subsequently be removed during the next phase of the pulsation cycle when the pulsator applies vacuum to the pulsation chamber. The additional air contained in the system supplied by the greater than atmospheric air must be removed by the vacuum source. This places an additional burden on the vacuum pump to remove that excess air and requires additional time to remove that air resulting in a slower response of the liner to open back into the milk phase. The situation is further worsened with typical conventional pulsators that are designed with one solenoid to control both air and vacuum supply to the pulsation chamber. There is a short time period in which the solenoid is transitioning from air to vacuum that both sources of supply are simultaneously connected causing greater than atmospheric air pressure to be supplied directly to the vacuum system causing even greater demand on the vacuum system and pump.

Referring to FIG. 1, a pulsator (16) includes three channels, A, B, and C, with channel A controlling the vacuum inlet (7) connected to a vacuum supply and channel B controlling the air pressure inlet (13) connected to air pressure supply (8). Channel A has a chamber or volume (6) and channel B has a chamber or volume (5). Chamber (6) has a vacuum pressure outlet (18) and a vacuum pressure inlet (7). Chamber or volume (5) has an atmospheric air pressure outlet (17) and an atmospheric air pressure inlet (13).

A first solenoid (2) is received within a first solenoid housing (20) with a first solenoid plunger (4) dedicated to the control of the vacuum supply provided by the vacuum inlet (7). The movement of the first solenoid plunger (4) determines whether vacuum is provided from the vacuum inlet (7) to the vacuum outlet (16). A second solenoid (1) is received within a second solenoid housing (19) with a second solenoid plunger (3) dedicated to the control of the atmospheric air pressure provided by the air pressure inlet (13) from the air pressure supply (8). The movement of the second solenoid plunger (3) determines air pressure is provided from the air pressure inlet (13) to the air pressure outlet (17). The combination of movement of the first and second solenoids (1, 2) control the fresh air and vacuum provided to a common pulsator output (10). This design eliminates a direct connection between the vacuum inlet (7) connected to the vacuum supply and fresh air inlet (13) connected to supply (8), thereby eliminating the problem of conventional pulsation designs when incorporating greater than atmospheric air pressure. The first and second solenoid plungers (3, 4) each have a first end (3a, 4a) and a second end (3b, 4b) with a seal (14, 15). The first and second solenoids (1, 2) may be controlled by a controller (not shown).

The design in FIG. 1 also allows for the fresh air, second solenoid plunger (3) to be closed when the pressure in the pulsation chamber or volume (5) has risen to and approximately achieved atmospheric air pressure for example 0.25 psi below atmospheric pressure to 1.0 psi above atmospheric pressure, thereby preventing the pulsation chamber or volume (5) itself from achieving an air pressure substantially greater than atmospheric air pressure.

The innovative design disclosed in FIG. 1 further provides an additional option for limiting the maximum pressure in the air supplied to the pulsation chamber or volume (5). A pressure control or limiting device (9) can be incorporated into the common output (10) of the pulsator. One example of such a device is a one-way valve that permits the flow of air in one direction when the pressure on the supply side exceeds a set value. The one-way valve then prevents the reverse flow of air when the pressure in the pulsator output (10) falls below the set value.

The innovative design disclosed in FIG. 1 further provides a means of sealing the solenoids (1, 2) to prevent air leakage during the application of positive pressure from supply (8) to the volume or pulsation chambers (5) and (6). A sealing material (11) and (12) is applied to the interior ends of solenoids (1) and (2), which each include their respective plungers (3), (4) to prevent the applied positive pressure air from exiting the pulsator chambers or volumes (5, 6) through the end of the solenoid. The sealing material is flowable at the time of application to the interior ends of the solenoids (1) and (2) and then cures in place. The final cured material must be greater in shape or volume than the size of the opening at the end of the solenoid it is sealing. Any material that can be dispensed (e.g. flowable) and then cure in place may be used as the sealing material. For example, a room temperature vulcanizing material such as silicone based materials may be used or rubber. The sealing material, once it cures cannot be pushed out of the end of the solenoid by either the positive pressure air or the impact of solenoid plungers (3) or (4) when power is applied to the solenoids (1, 2).

Figure 4:
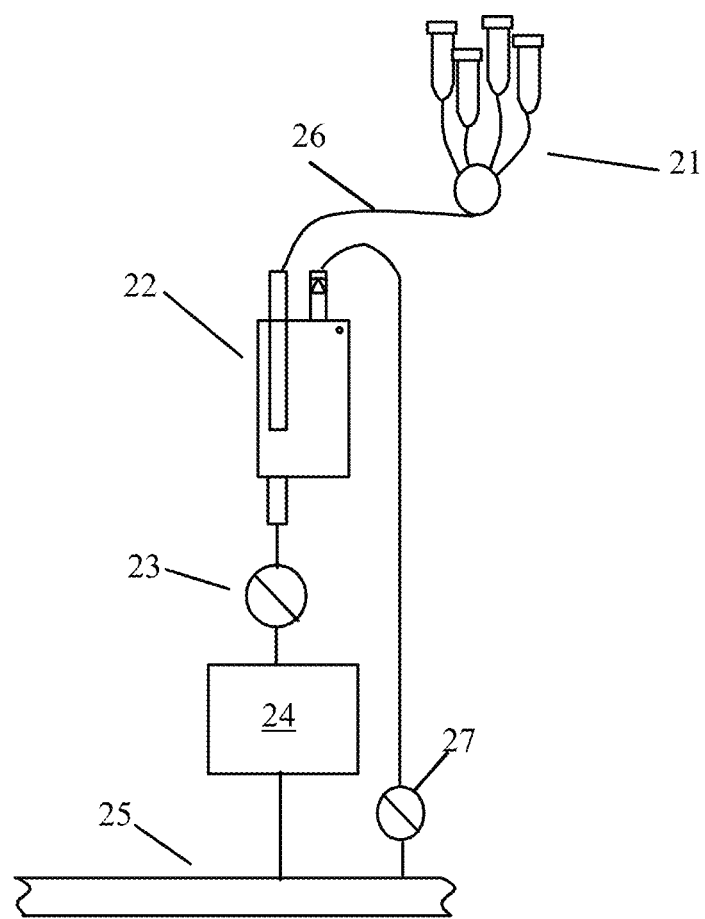
FIG. 4 shows a schematic of the vacuum controlled volume apparatus of the present invention installed in a milking system.

Referring to FIG. 4 a vacuum controlled volume apparatus (22) of the present invention used in the milking process of animals is shown installed in a typical milking system. The typical conventional milking system has a hose (26) connected to an assembly referred to as a milking cluster (21) such that the hose (26) provides a flow path for milk from the milking cluster (21) and that flow path also provides a vacuum from a vacuum source. Hose (26) is then connected to either a larger pipe (25) to transport the milk to a collection tank (not shown) or is connected to other milking system components such as milk flow sensors (24), milk meters and shut off valves (23). Those other components create flow path restrictions that result in the milk flow velocity being reduced and the vacuum supplied to the cluster being restricted resulting in undesirable drops and fluctuations. It should be noted that several hose connections are shown in FIG. 4, but that there is only one hose connection (26) to the milking cluster (21).

Figure 3:
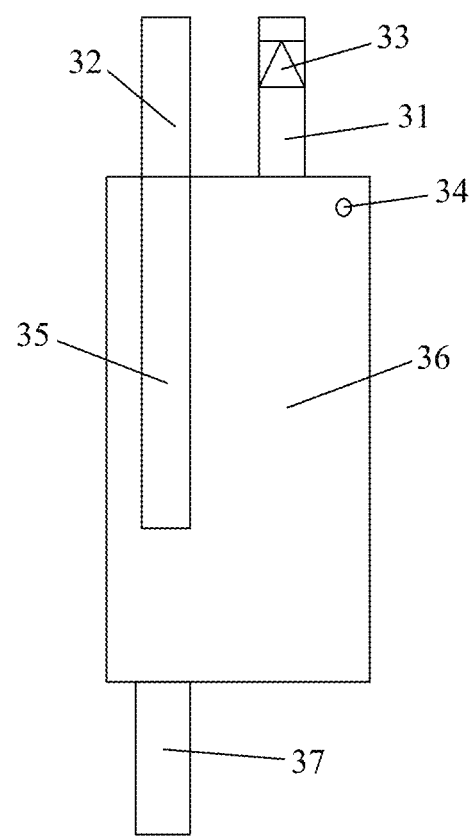
FIG. 3 shows a schematic of a vacuum controlled volume apparatus of the present invention.

The vacuum controlled volume apparatus (22), shown in greater detail in FIG. 3 of the present invention has a connection (31) that provides a means of connecting volume (36) to an alternate vacuum source either shut off valve (27) or pipe (25) of FIG. 4. Volume (36) provides a common chamber to interconnect connection (32) to the milking cluster (21) and to connection (31) that connects to an alternate vacuum source and finally to connection (37) that connects to the milk flow sensor (24) or milk meter and the pipe (25) to transport the milk to a collection tank (not shown).

The vacuum controlled volume apparatus (22) may also include a vent hole (34) and a vacuum regulation feature (33). The vacuum regulation feature (33) or vacuum limiting device can be incorporated into the connection (31) to the alternate vacuum source. One example of such a device is a one-way valve that permits the flow of air in one direction when the pressure on the supply side exceeds a set value. The valve then prevents the flow of air when the pressure in volume (36) falls below the set value. The absolute pressure in volume (36) must be the same as or greater than that of the source for output through connection (37) to maintain flow of milk from volume (36) through the connection (37). The vent hole (34) provides an alternate means of limiting vacuum level within the volume (36).

The vacuum controlled volume apparatus (22) may include pipe (35), attached to connection (32), to provide a means of limiting the unintended flow of milk into connection (31). During periods of high milk flow it is possible that milk could flow towards connection (31) instead of through connection (37). The addition of pipe (35) directs the incoming flow of milk from inlet connection (32) towards outlet connection (37).

The vacuum controlled volume apparatus (22) of the present invention reduces vacuum reductions and fluctuations in the claw of the milking cluster (21) by providing an alternate source of vacuum (31) to the hose connection (26) supplied to the milking cluster (21). The alternate source of vacuum is provided by a connection to vacuum source (25) or through shut off valve (27) that is connected to a vacuum source (25) to provide a path that does not flow through the milk flow sensors (24) or milk meters of the existing milking system.

Figure 5:
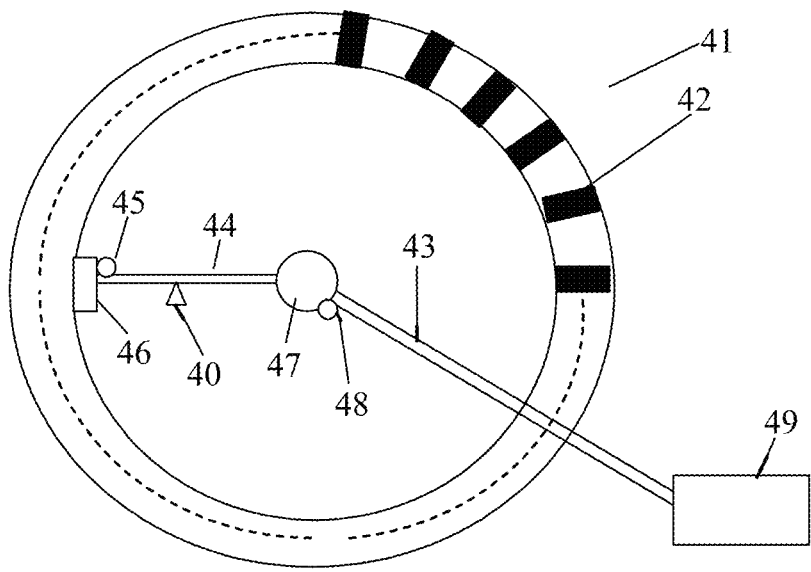
FIG. 5 shows a schematic of a wireless vacuum control apparatus of the present invention installed in a milking system.

FIG. 5 shows a wireless vacuum control apparatus of the present invention configured in a typical rotary milking facility. Typical milking facilities incorporate variable speed vacuum pump control technology to minimize the electrical energy required to provide vacuum. This is accomplished by continuously monitoring the system operating vacuum level and adjusting pump motor speed to vary the supply of vacuum to the system. A means of measuring vacuum level is required and is typically accomplished with the use of a vacuum transducer. Rotary style milking facilities utilizing this technology typically have the transducer installed at location (48) as shown in FIG. 5. This is because the rotation of the platform requires slip bands in the center (47) of the rotary (41). The electrical noise generated by those slip bands creates voltage errors that make variable speed control difficult, if not impossible, resulting in the transducer being placed at location (48) or another location between location (48) and pump (49).

Large rotary parlors can milk many animals (42) at one time, and therefore the diameter of the rotary (41) is large and the length of vacuum supply pipes (43) and (44) are also very long resulting in large distances between the vacuum pump (49) and the individual milking clusters on each animal (42). The milk collecting volume or receiver (46), is the central collection point for milk on the rotary platform (41) and is the source of stable vacuum for the individual milking clusters (21) attached to each animal (42) being milked. It is desirable to sense the vacuum level as close as possible to the receiver (46) and to regulate vacuum pump speed based on that measured value to achieve the most stable vacuum for the milking system.

The present invention provides a wireless transducer assembly (45) near the receiver (46) for measuring the vacuum level at or near the receiver (46). This assures the most accurate sensing of vacuum level at the receiver (46) while also regulating the vacuum in the receiver (46) directly without the added burden of directly regulating vacuum in the pulsation system also, as is done with the transducer located at location (48).

The present invention may further include a variable speed vacuum control system as disclosed in U.S. Pat. No. 6,045,331, which is hereby incorporated by reference. The variable speed vacuum control system of the present invention controls a variable speed vacuum pump with the combination of a transducer, in this case the wireless transducer assembly (45) of the present invention and a mechanical vacuum regulator (40) located between the center (47) of the rotary (41) and the milk collection volume or receiver (46). The mechanical regulator (40) provides for the regulation of vacuum very close to receiver (46) by allowing the operating speed of the vacuum pump (49) to supply more vacuum than is required by the rotary (41) for most of the milking time. The speed of the pump (49) is only increased to address situations requiring additional vacuum as detected by transducer (45) with the variable speed pump controller (50) adjusting the adjustable frequency motor drive and control circuits to vary fluid pump motor speeds based on system fluid demand monitored by a sensor as described by U.S. Pat. No. 6,045,331.

Figure 6:
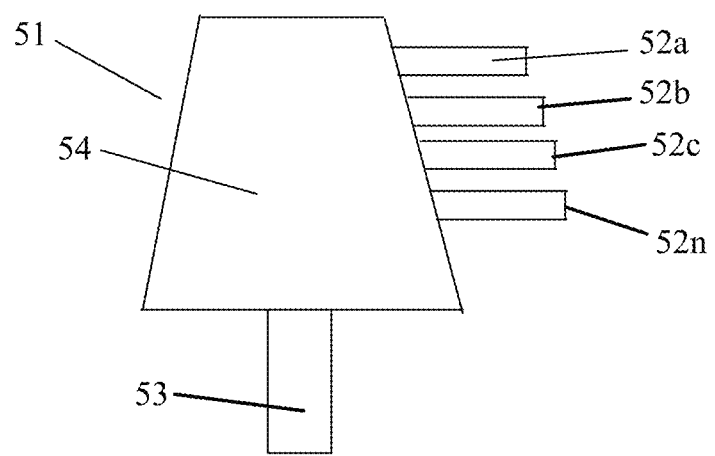
FIG. 6 shows a schematic of the multi-hose collection volume apparatus of the present invention.

FIG. 6 shows a multi-hose collection volume apparatus (51) of the present invention. Typical conventional milking systems include a milking cluster (21) that provides a collecting volume for the flow of milk from multiple liners with a single outlet hose interface to extract the milk from the volume. Robotic milking systems do not utilize a cluster and instead have very long hoses connected to each individual teat cup with those hoses connected to milk flow sensors and shut off valves with some robots having a collecting volume apparatus. The design of the collecting volume apparatus typically results in the flow from each individual hose connection interfering with the milk and vacuum flow of the other hoses as the flow from one hose flows over the entry point of another hose within the collection volume apparatus.

Figure 9:
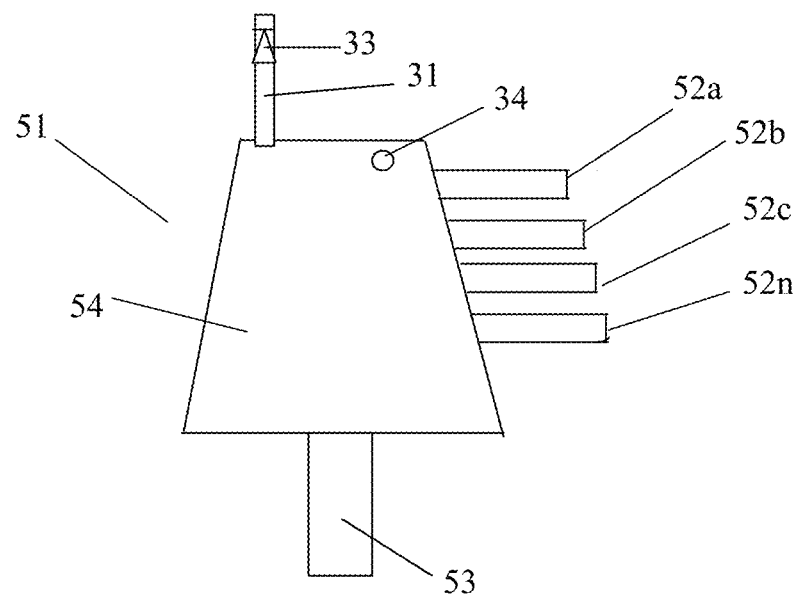
FIG. 9 shows a schematic of a multi-house collection volume apparatus with an alternate vacuum supply regulated feature.

The multi-hose collection volume connects the individual hoses connections (52a-52n) from hoses of the robotic milking systems into a single collecting volume (54) with an outlet (53) in a manner in which the flow of milk from one hose inlet connection (52a) of a hose (52) does not directly flow over an entrance port of another hose inlet connection (52b-52n). While only four hose inlet connections (52a-52n) are shown two or more connections may be part of the multi-hose collection volume (51), as long as the inlet connection does not directly flow over an entrance port of another hose inlet connection. The proposed invention may be further improved by combining the innovations of FIG. 6 with those disclosed in FIG. 3 as is shown in FIG. 9. The multi-hose collection volume (51) of FIG. 9 adds an alternate vacuum supply regulated feature (33) through a connection (31) at the top of the multi-hose collection volume (51). The connection (31) is connected to an alternate vacuum source.

Figure 7A:
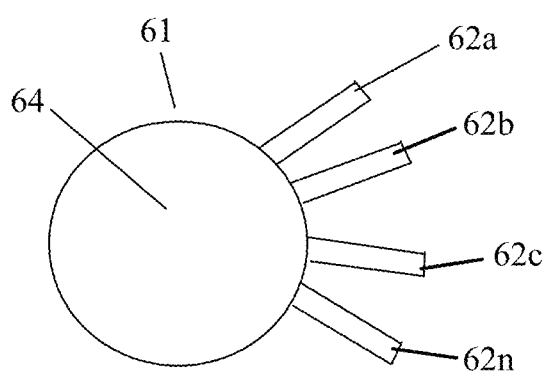
FIG. 7a illustrates a top view of an alternate multi-hose collection volume apparatus of the present invention.
Figure 7B:
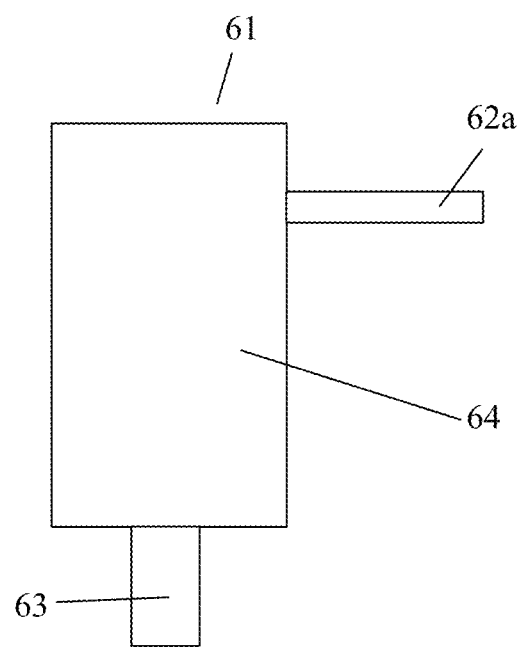
FIG. 7b illustrates a side view of an alternate multi-hose collection volume apparatus of the present invention.

FIG. 7a-7b provides an alternate configuration of the multi-hose collection volume (61) of FIG. 6 in which hose inlet connections (62a-62n) are arranged radially around the collecting volume (64) with an outlet (63). While only four hose inlet connections (62a-62n) are shown, two or more connections may be part of the multi-hose collection volume (61), as long as the inlet connection does not directly flow over an entrance port of another hose inlet connection.

Figure 8:
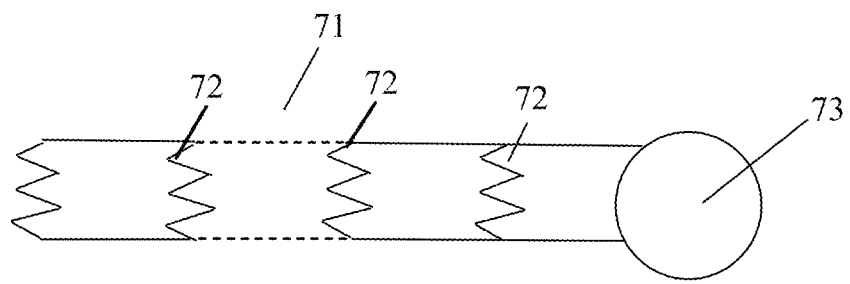
FIG. 8 shows a schematic of a failed solenoid detection apparatus of the present invention.

FIG. 8 shows a failed solenoid detection apparatus (71) of the present invention. A typical milking system will have more than one pulsator (16) connected to a common power source (73) with the pulsator have one or more solenoids with wound coils (72) connected to the power source (73). The power source (73) may contain a computer with a failed solenoid detection program. Each solenoid has a known electrical resistance and therefore a known amount of electrical current required to be supplied to the solenoid by the power source (73).

The present invention employs a method of detecting a failed solenoid by a failed solenoid detection program of the computer of the power source (73) monitoring the total current supplied to group of solenoids of a pulsator by the power source and then the failed solenoid detection program either continuously or periodically compares an applied (measured) current of the pulsator to a known (expected) required current of the groups of solenoids. If the comparison of the measured total current is not equal to or is less than the expected total current, the failed solenoid detection program sends an indication of a group of solenoid failures to a user, for example through a visual indicator on the pulsator, such as an LED light.

If the comparison of the applied (measured) current of the pulsator to a known (expected) required current of the groups of solenoids is equal, the failed solenoid detection program continues or periodically monitors the total current being supplied.

A failed solenoid may also have a plunger that is stuck in the pulled in condition. Referring to FIG. 1, if the first plunger (3) is stuck in the pulled-in condition (e.g. where the seal (14) of the first plunger (3) does not contact seal off the fresh air supply from the common pulsator output (10)) then a continuous connection to the air supply (8) and vacuum source through vacuum inlet (7) will exist whenever the second plunger (4) is lifted. This will result in an excess volume of fresh air being consumed which can be detected by a pressure transducer measuring, for example by a computer with a failed solenoid detection program, a pressure drop in the positive pressure source (8). The known pressure drop characteristics of pressure source (8) can be monitored, for example by the solenoid detection program, to determine if and when the stuck plunger condition exists. The same monitoring approach can be applied with a stuck plunger on the vacuum side of the pulsator if the second plunger (4) becomes stuck in the pulled-in condition.

Figure 10:
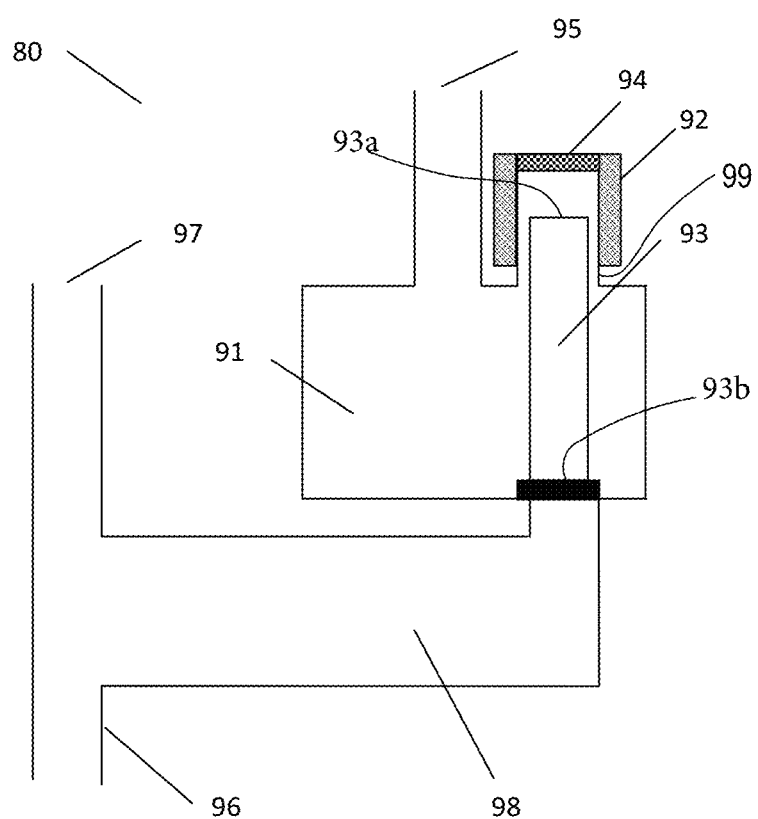
FIG. 10 shows a schematic of a fresh air supply valve assembly.
Figure 11:
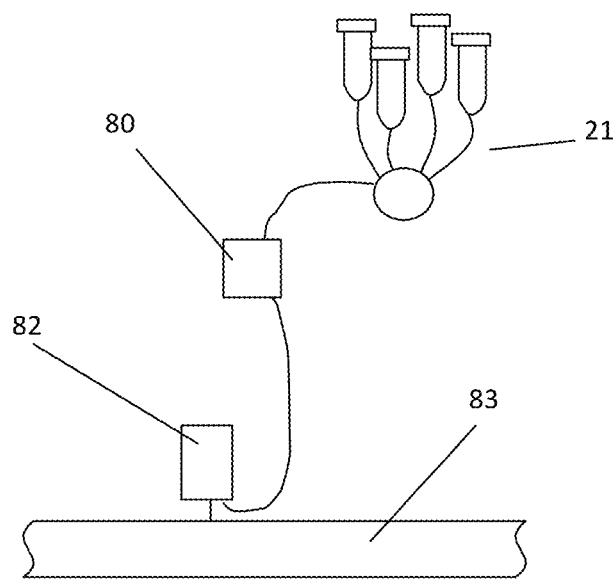
FIG. 11 shows an arrangement of milking clusters relative to a pulsator vacuum source.
Figure 12:
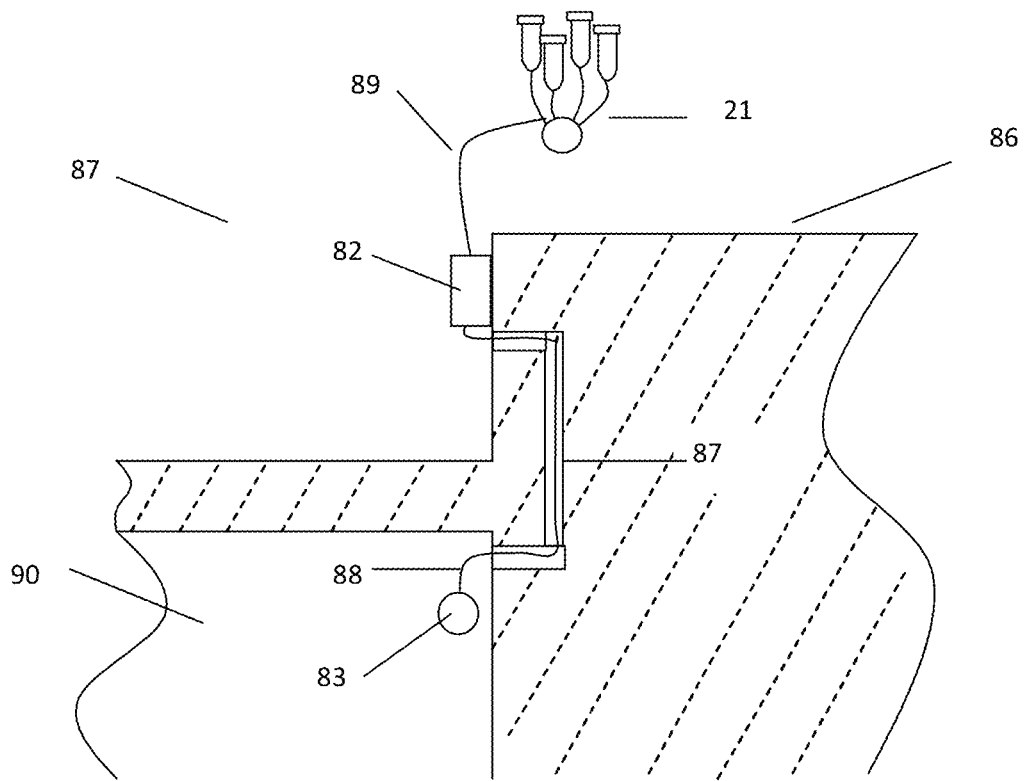
FIG. 12 shows an alternate arrangement of milking clusters relative to a pulsator vacuum source.

FIG. 10-FIG. 12 show arrangements of milking clusters (21) relative to pulsator vacuum source (83). Some milking facilities are designed such that the distance between cluster (21) and vacuum source (83) are very large (greater than 8.5 feet) causing air flow restrictions in the hoses (89) connecting the pulsation chambers of the clusters to the pulsator (82). The present invention seeks to address this problem that exists in many milking facilities which includes rotary parlors (41) and basement style parlors (87).

In one embodiment, a separate fresh air valving mechanism (80) is located between cluster (21) and pulsator (82). This fresh air valving mechanism (80) has a function similar to that of chamber B of pulsator (16). Solenoid plunger (93) is received within a solenoid housing (99) and controls chamber 91. The movement of the solenoid plunger (93) determines air pressure is provided from the air pressure inlet (95) to the air pressure outlet (98) and to outlet port (97) connected to pulsation chamber(s) of the cluster (21). The solenoid plunger (93) has a first end (93a) and a second end (93b) with a seal (94). The solenoid (92) may be controlled by a controller (not shown). The solenoid (92) is sealed to prevent air leakage during the application of positive pressure from the fresh air supply (95) to the volume or chambers (91). A sealing material (94) is applied to the interior end of the solenoid (92), to prevent the applied positive pressure air from exiting the chamber or volume (91) through the end of the solenoid. The sealing material is flowable at the time of application to the interior end of the solenoid (92) and then cures in place. The final cured material must be greater in shape or volume than the size of the opening at the end of the solenoid it is sealing. Any material that can be dispensed (e.g. flowable) and then cure in place may be used as the sealing material. For example, a room temperature vulcanizing material such as silicone based materials may be used or rubber. The sealing material, once it cures cannot be pushed out of the end of the solenoid by either the positive pressure air or the impact of solenoid plunger (93) when power is applied to the solenoid (92).

The separate fresh air valving mechanism (80) will have an inlet port (96) to connect to the outlet port of pulsator (82) and an outlet port (97) to connect to pulsation chamber(s) of cluster (21) or the individual pulsation chambers of a robotic milking system.

The plunger (93) is operated in unison with plunger (3) to simultaneously connect fresh air sources (13) and (95) to the pulsation chamber(s) of cluster (21).

An additional option for limiting the maximum pressure in the air supplied to the pulsation chamber or volume (91) may be supplied. A pressure control or limiting device (9) can be incorporated into the output (98) of the pulsator. One example of such a device is a one-way valve that permits the flow of air in one direction when the pressure on the supply side exceeds a set value. The one-way valve then prevents the reverse flow of air when the pressure in the pulsator output (98) falls below the set value.

It should be noted that the fresh air valve mechanism (80) may incorporate the greater than atmospheric air as discussed above in reference to chamber B of the pulsator (16). For example, the solenoid plunger (93) may be closed when the pressure in the pulsation chamber or volume (91) has risen to and approximately achieved atmospheric air pressure for example 0.25 psi below atmospheric pressure to 1.0 psi above atmospheric pressure, thereby preventing the pulsation chamber or volume (91) itself from achieving an air pressure substantially greater than atmospheric air pressure.

In another embodiment, the milking system is a basement style parlor (87) in which the animal being milked is located on a first floor (86) with the milking cluster (21) and the pulsator (82). The pulsator (82) is located separately from the vacuum source or vacuum supply pipe (83). A pipe or hose (88) provides vacuum from the vacuum source (83) to the pulsator (82) between the floors and may be present in a channel (87). The vacuum source or vacuum supply pipe (83) is located in separate room on a separate floor (90) than the animal being milked. The separate room on the separate floor (90) also includes a pipe for transporting the milk to a holding tank. Fresh air is supplied to pulsator (82) in a manner similar to pulsator (16).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pulsator for alternatingly supplying air and vacuum to a pulsation chamber to open and close a flexible liner of a teat cup assembly of a milking system attached to an animal comprising:

a first valve comprising:
- a first solenoid housing having a first end open to a channel and a second end;
- a first solenoid having an interior end, located within the channel of the first solenoid housing;
- a respective inlet and a respective outlet through which greater than atmospheric pressure air can be respectively supplied to the pulsation chamber of the teat cup assembly; and
- a first solenoid valve plunger reciprocally movable in the first solenoid housing with a first end in the channel for sealing the inlet from the outlet and a second end opposite the first end;

a second valve comprising:
- a second solenoid housing having a first end open to a channel and a second end
- a second solenoid having an interior end, within the channel of the second solenoid housing;
- a respective inlet and a respective outlet through which a vacuum can be respectively supplied to the pulsation chamber of the teat cup assembly; and
- a second solenoid valve plunger reciprocally movable in the second solenoid housing with a first end in the channel for sealing the inlet from the outlet and a second end opposite the first end;

a common outlet operatively connected to both the valves through which air pressure and vacuum are alternately supplied to the pulsation chamber of the teat cup assembly from the first and second valves, respectively; and a controller connected to the first solenoid of the first valve and the second solenoid of the second valve, the controller respectively actuating and deactivating the first and second valves to provide alternating supply of greater than atmospheric pressure air and vacuum to the common outlet, with the first and second valve never being simultaneously actuated.

2. The pulsator of claim 1, wherein the first solenoid which controls the greater than atmospheric pressure air is opened for a limited time to regulate an absolute pressure being supplied to the pulsation chamber through the common outlet.

3. The pulsator of claim 1, further comprising a pressure limiting device on the common outlet to limit an absolute pressure supplied to the pulsation chamber.

4. The pulsator of claim 3, wherein the pressure limiting device is a pressure relief valve.

5. The pulsator of claim 3, wherein controller does not deactivate the first solenoid when pressure in the common outlet is approximately at atmospheric pressure.

6. The pulsator of claim 3, wherein the controller deactivates the first solenoid as soon as the pressure in the common outlet is approximately at atmospheric pressure.

7. The pulsator of claim 1, further comprising a flexible sealing material on the interior end of the first solenoid and the second solenoid which cannot be pushed out of the first solenoid by air pressure or impact of the first solenoid valve plunger and cannot be pushed out of the second solenoid by impact of the second solenoid.

8. The pulsator of claim 7, wherein the flexible sealing material is applied to the interior end of the first solenoid and the second solenoid in a flowable state and cured onto the interior end of the first solenoid and second solenoid.

9. The pulsator of claim 1, wherein the controller deactivates the second solenoid as soon as the pressure in the common outlet is approximately at atmospheric pressure.

* * * * *